United States Patent
Perrin et al.

(10) Patent No.: US 7,581,394 B2
(45) Date of Patent: Sep. 1, 2009

(54) VARIABLE NOZZLE DEVICE FOR A TURBOCHARGER

(75) Inventors: Jean-Luc Perrin, Thaon les-Vosges (FR); Giorgio Figura, Thaou-les-Vosges (FR)

(73) Assignee: Honeywell International Inc., Morristown, NJ (US)

( * ) Notice: Subject to any disclaimer, the term of this patent is extended or adjusted under 35 U.S.C. 154(b) by 226 days.

(21) Appl. No.: 10/582,103

(22) PCT Filed: Dec. 10, 2003

(86) PCT No.: PCT/EP03/14013

§ 371 (c)(1),
(2), (4) Date: Feb. 22, 2007

(87) PCT Pub. No.: WO2005/059317

PCT Pub. Date: Jun. 30, 2005

(65) Prior Publication Data

US 2007/0227603 A1    Oct. 4, 2007

(51) Int. Cl.
  F02D 23/00  (2006.01)
  F02B 33/44  (2006.01)
  F01N 5/04   (2006.01)
  F01N 3/00   (2006.01)
  F01D 17/12  (2006.01)
  F01D 17/14  (2006.01)

(52) U.S. Cl. .............. 60/602; 60/612; 60/280; 60/285; 60/286; 415/158; 415/157

(58) Field of Classification Search ........... 60/602, 60/612, 280, 285–286; 415/157–159
See application file for complete search history.

(56) References Cited

U.S. PATENT DOCUMENTS

| | | | | | |
|---|---|---|---|---|---|
| 2,957,424 | A | * | 10/1960 | Brundage et al. | 415/158 |
| 2,996,996 | A | * | 8/1961 | Jassniker | 415/158 |
| 3,032,259 | A | * | 5/1962 | Jassniker | 415/148 |
| 4,056,330 | A |   | 11/1977 | Lieber | 418/158 |
| 4,378,194 | A | * | 3/1983 | Bandukwalla | 415/158 |
| 4,586,336 | A | * | 5/1986 | Horler | 60/602 |
| 4,802,817 | A | * | 2/1989 | Tyler | 415/157 |
| 4,973,223 | A | * | 11/1990 | Franklin | 415/157 |
| 6,158,956 | A |   | 12/2000 | Arnold | 415/158 |
| 6,216,459 | B1 | * | 4/2001 | Daudel et al. | 60/602 |
| 6,715,288 | B1 | * | 4/2004 | Engels et al. | 60/602 |
| 6,726,447 | B2 | * | 4/2004 | Lutz | 415/158 |
| 6,804,952 | B2 | * | 10/2004 | Sasaki et al. | 60/284 |

(Continued)

FOREIGN PATENT DOCUMENTS

DE    43 03 520 C1  *  9/1994

(Continued)

OTHER PUBLICATIONS

PCTISR Apr. 17, 2004, Honeywell.

*Primary Examiner*—Thai Ba Trieu
(74) *Attorney, Agent, or Firm*—Alston Bird

(57)  ABSTRACT

A nozzle device for a turbine of a turbocharger according to the present invention comprises variable annular nozzle (2) defined between an inboard wall (3) and an outboard wall (4), wherein said outboard wall (4) is axially movable for completely closing said variable annular nozzle (2).

10 Claims, 10 Drawing Sheets

U.S. PATENT DOCUMENTS

| | | | |
|---|---|---|---|
| 6,928,816 B2 * | 8/2005 | Leavesley | 60/602 |
| 7,024,855 B2 * | 4/2006 | Perrin et al. | 60/602 |
| 7,338,254 B2 * | 3/2008 | Lombard et al. | 415/167 |
| 2002/0078934 A1 * | 6/2002 | Hohkita et al. | 60/602 |
| 2005/0188682 A1 * | 9/2005 | Fledersbacher et al. | 60/280 |

FOREIGN PATENT DOCUMENTS

| | | | |
|---|---|---|---|
| DE | 19835594 A1 * | 2/2000 |
| DE | 199 24 228 A1 * | 12/2000 |
| DE | 10210369 A1 * | 9/2003 |
| EP | 342889 A1 * | 11/1989 |
| EP | 678657 A2 * | 10/1995 |
| EP | 1260675 A1 * | 11/2002 |
| GB | 874085 * | 8/1961 |
| WO | WO 0244527 A1 * | 6/2002 |
| WO | WO 2004035994 A1 * | 4/2004 |
| WO | WO 2004063535 A1 * | 7/2004 |
| WO | WO 2005106212 A1 * | 11/2005 |
| WO | WO 2007058649 A1 * | 5/2007 |

* cited by examiner

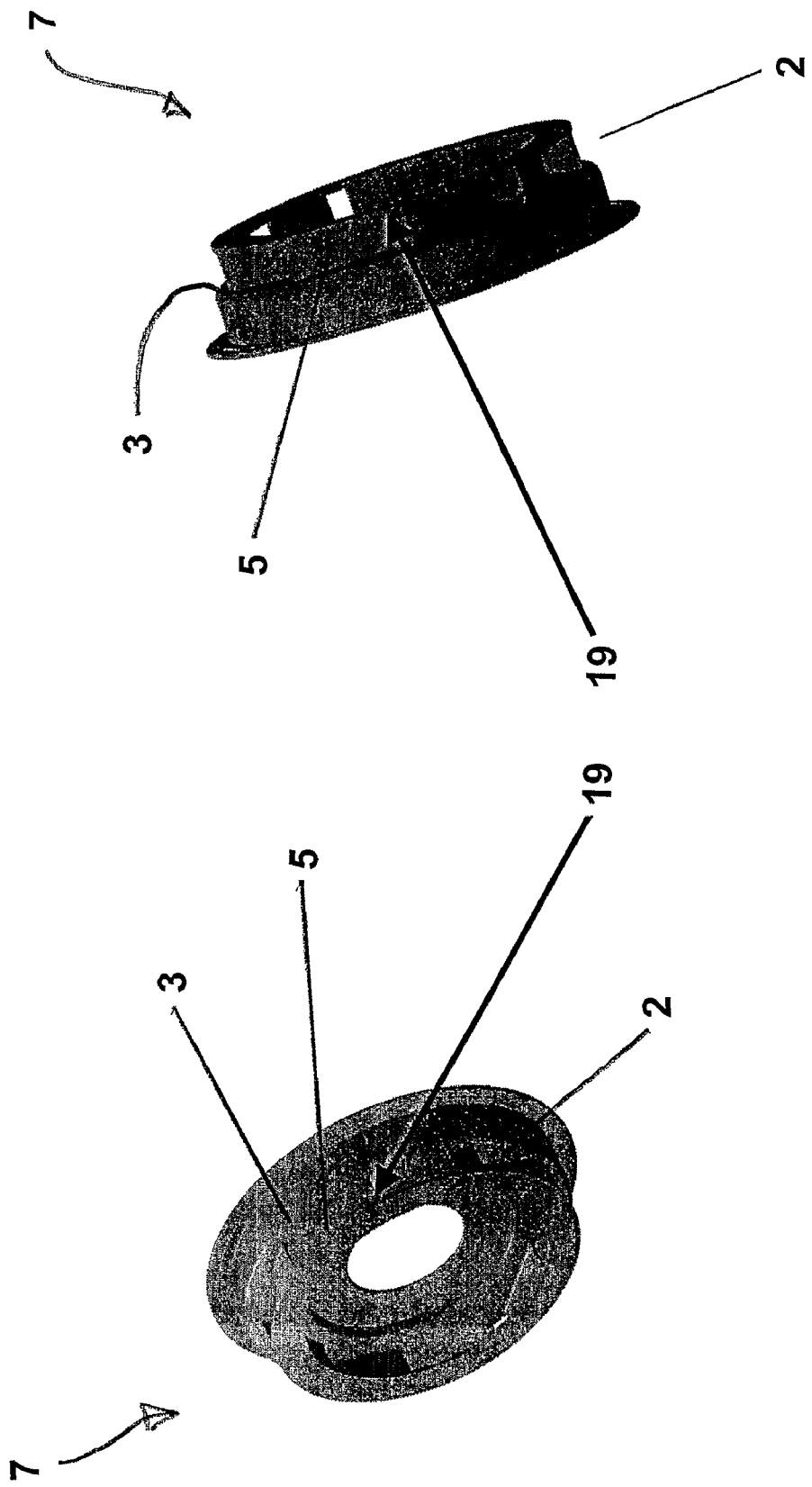

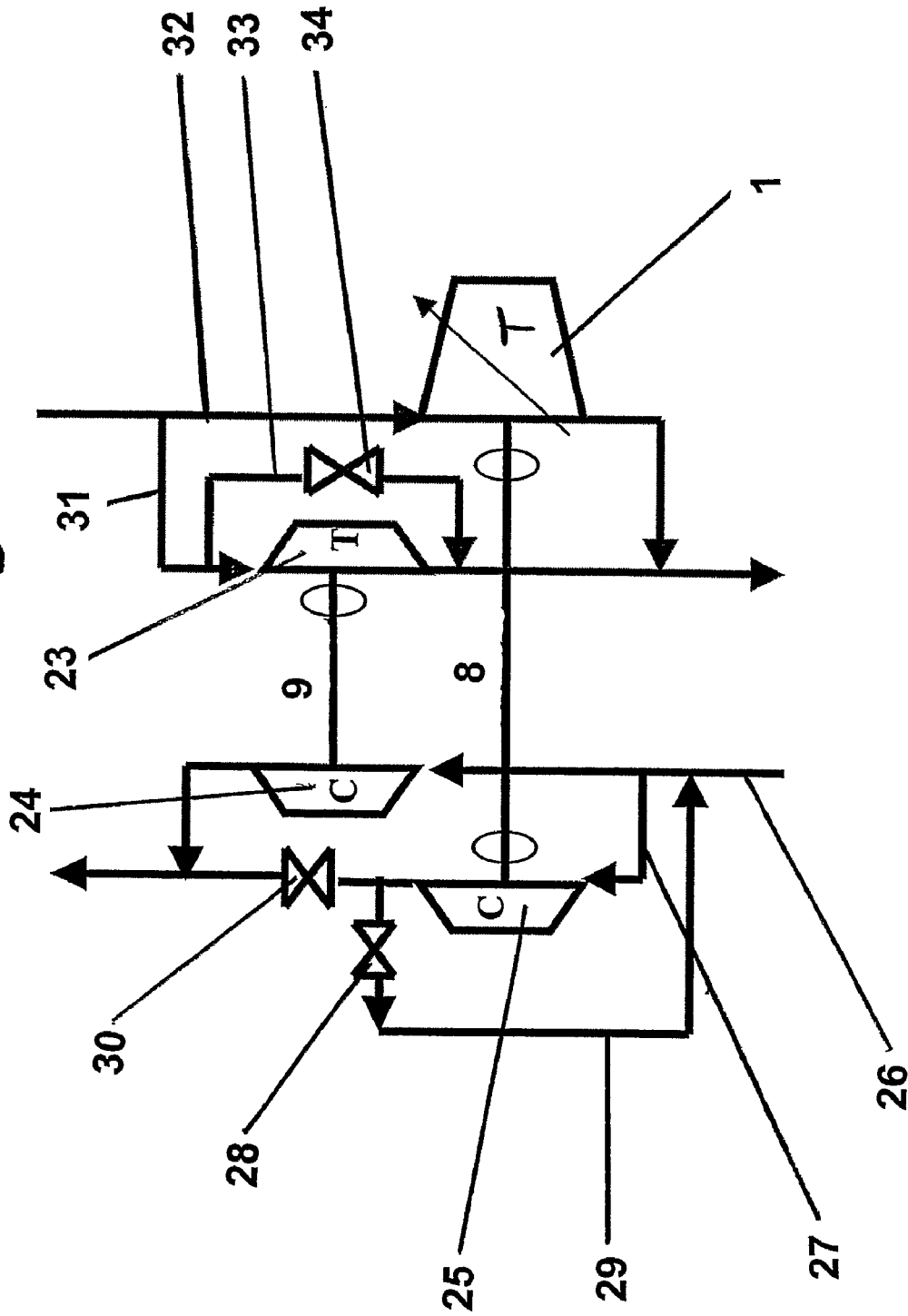

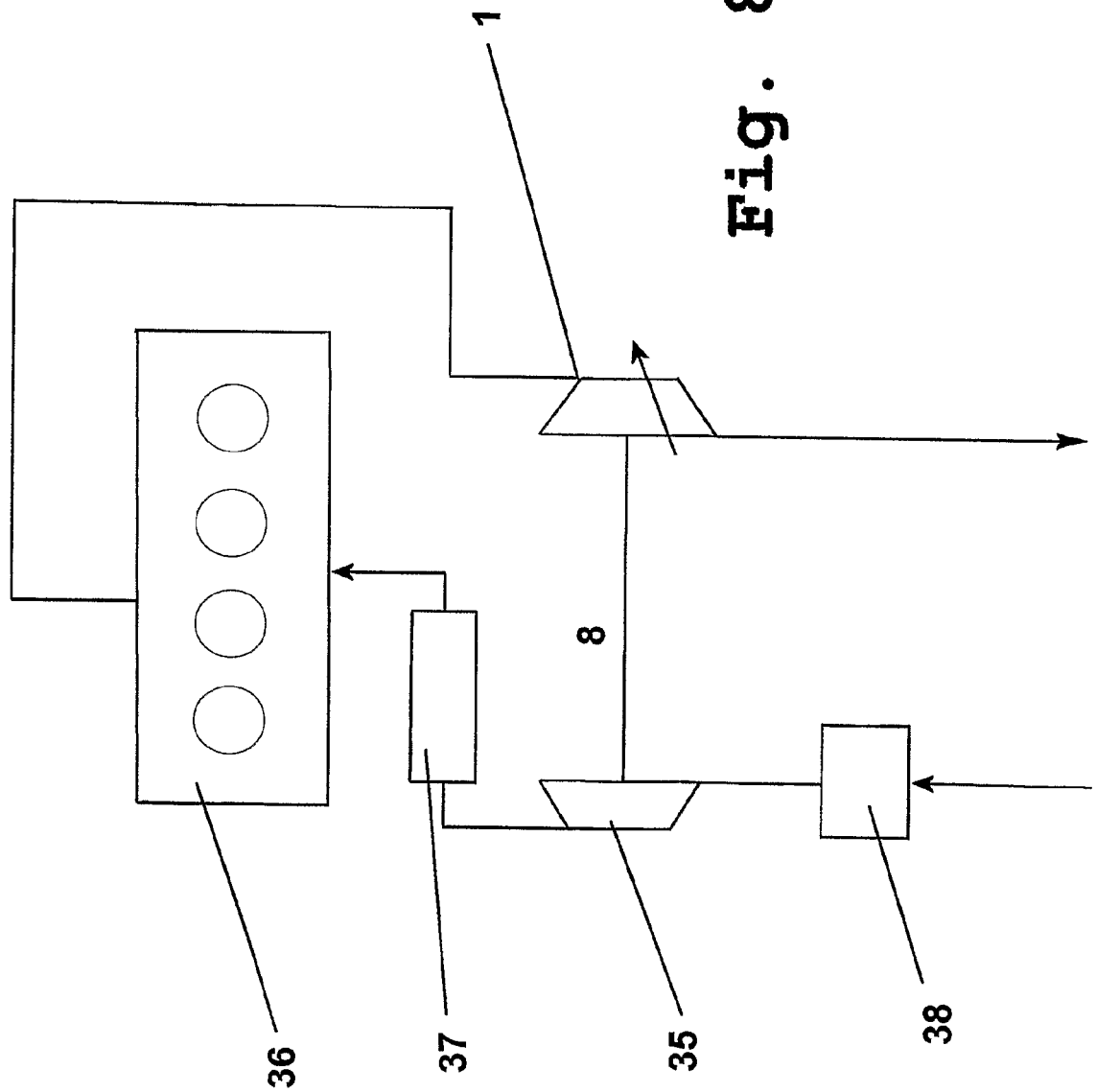

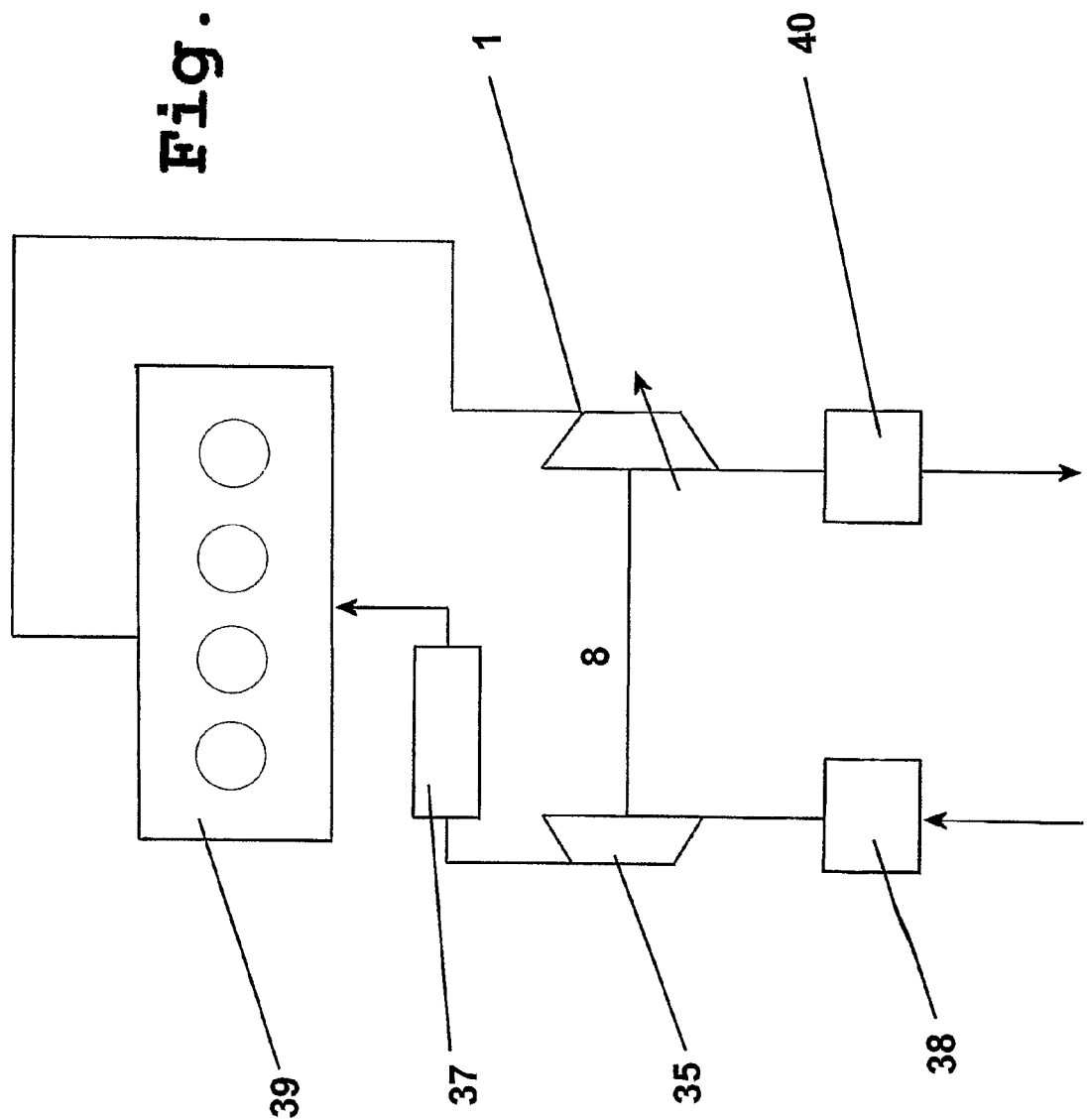

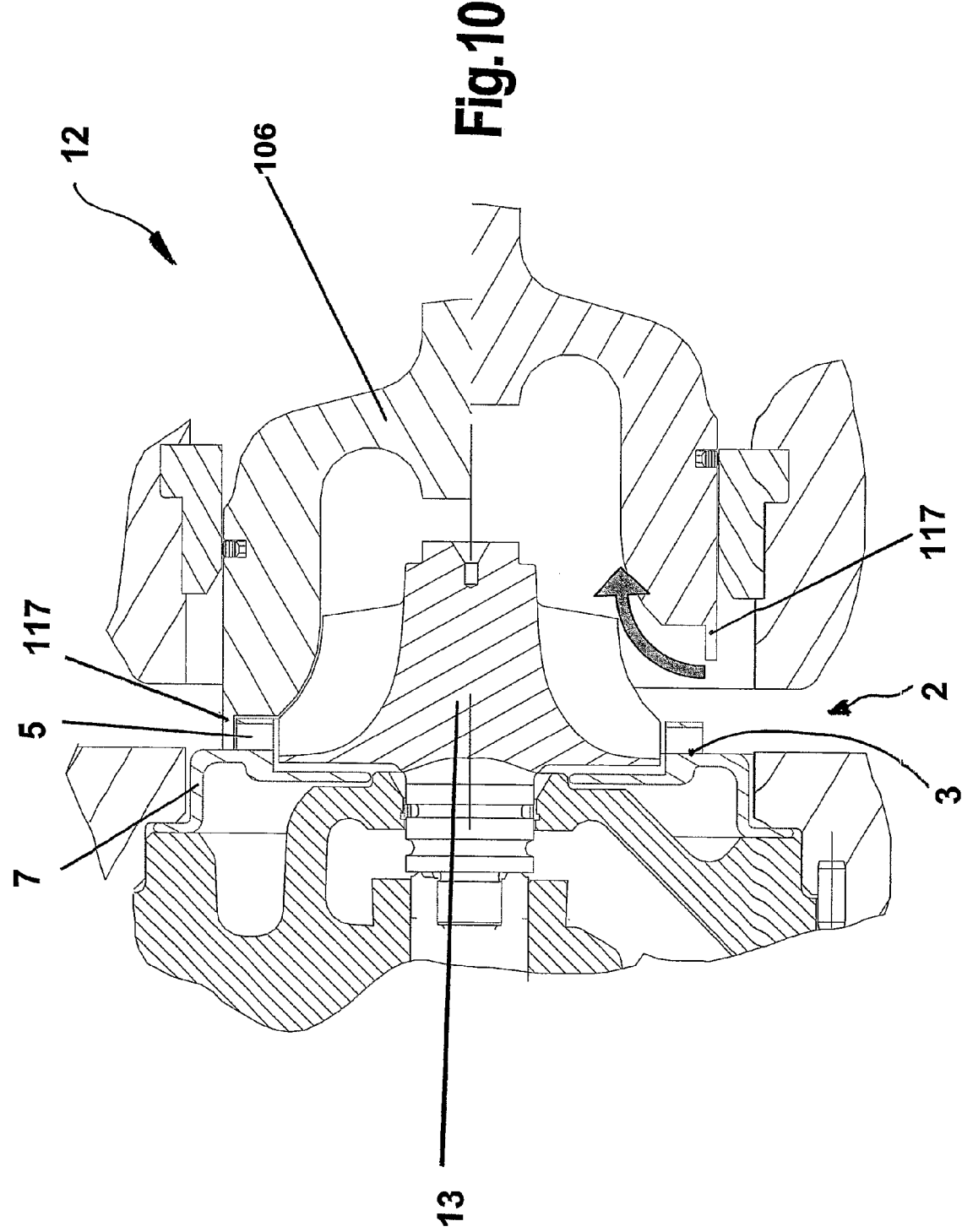

VARIABLE NOZZLE DEVICE FOR A TURBOCHARGER

BACKGROUND OF THE INVENTION

The present invention relates to a variable nozzle device and in particular to a variable nozzle device for a turbocharger. Also, the invention relates to a parallel configuration of turbochargers and a method for operating the same, a diesel engine boosting system and an engine boosting system.

The International Patent Application PCT/IB03/000042 (published as WO 2004/063535 A1) discloses a parallel configuration of turbochargers (601, 602), wherein both turbines (605, 607) thereof are connected in parallel according to FIG. 4. At low rotational speeds, the second turbocharger is not operated. This configuration needs an external control valve (633) for fully closing the turbine of the second turbocharger at low rotational speeds. At high rotational speeds, the valve must be opened to operate the second turbocharger.

A fully closable nozzle device is known from the Japanese Patent Publication JP-A-2002-038964. The variable nozzle device is constituted by pivotable vanes such that a geometric arrangement of the flow passage is adjustable.

The tips of the pivotable vanes respectively abut against an adjacent vane such that the flow passage through the nozzle is nearly fully closed.

It is the object of the present invention to provide means for fully closing the flow passage to the turbine for a turbocharger having a simplified and reliable structure.

SUMMARY OF THE INVENTION

The object is solved by a nozzle device for a turbine of a turbocharger, comprising a variable annular nozzle defined between an inboard wall and an outboard wall, wherein the outboard wall is axially movable for completely closing the variable annular nozzle. Advantageously, the inventive nozzle device needs no external control valve for closing the turbine.

Preferably, an annular arrangement of vanes is interposed in the variable annular nozzle, and the outboard wall is constituted by a tube-shaped piston which is axially slidable into the radial inside or onto the radial outside of the annular arrangement of vanes so as to contact the inboard wall. The vanes and the tube-shaped piston regulate the exhaust gas flow into the annular nozzle.

The tube-shaped piston may comprise a stepped portion which is axially slidable onto the radial outside of the annular arrangement of vanes, wherein the stepped portion directs exhaust gas entering into the turbine to the downstream side of the turbine. This is advantageously when the exhaust gas flow shall bypass the turbine wheel, for instance when a catalyst shall quickly be heated up.

Preferably, the annular arrangement of vanes extends only over a part of the maximum interval between the inboard and outboard walls so that there is no flow resistance due to the vanes when the annular nozzle is fully opened, i.e. when the interval between the inboard and outboard walls becomes maximum.

The inboard wall may be constituted by a vaned shroud having the annular arrangement of vanes.

The object is also solved by a engine boosting system comprising a parallel configuration of a first and a second turbocharger, wherein a turbine of the second turbocharger comprises a variable nozzle device which is capable of completely closing the nozzle opening thereof.

Advantageously, the engine boosting system needs no external control valve for closing the turbine.

The object is also solved by a method for operating an internal combustion engine with a parallel configuration of turbochargers, wherein the variable nozzle device of the second turbocharger (8) completely closes its nozzle opening when the second turbocharger (8) is driven under low rotational speed of the engine.

The present invention may be used in a diesel engine boosting system comprising a turbocharger comprising a compressor and a turbine having the nozzle device according to the present invention and control means for closing the turbine annular nozzle to an optimum position for engine braking where there is provided a high boost pressure and a high back pressure at the same time. A diesel engine generally requires for an engine braking operation, on the one side, a high back pressure upstream of the turbine to achieve a high engine brake effect. The back pressure upstream of the turbine increases as the opening of the nozzle device decreases. On the other side, the pressure within a combustion cylinder of the engine must be on a high level for maintaining the high back pressure upstream of the turbine. That is, for achieving a high pressure in the cylinder, the boost pressure downstream the compressor must be high which in turn requires an operation of the compressor to some extent. The compressor increases the boost pressure as the opening of the nozzle device in the turbine increases. Consequently, the opening of the nozzle device must be optimised so as to achieve a large back pressure upstream the turbine as well as a large boost pressure downstream the compressor. The optimisation of the nozzle opening is preferable performed by an electronic control device, for instance by means of a feedback-control of the back pressure upstream the turbine. The back pressure may be detected by means of a pressure detecting device which is disposed upstream the turbine. The electronic control device variably feedback-controls the nozzle opening and must be free of any mechanical restrictions thereof. Thus, the variable nozzle device according to the present invention is advantageously suitable for this diesel engine boosting system because it is completely closeable so that there are no mechanical restrictions during the optimisation process.

The present invention may be used in an engine boosting system comprising a turbocharger and a catalyst disposed downstream of the turbocharger, wherein the turbocharger comprises an exhaust gas driven turbine having a turbine wheel and an annular nozzle which can be opened such that the exhaust gas flow substantially bypasses the turbine wheel. The catalyst exhibits its optimum purifying function only when the catalyst has reached a specific exhaust gas purifying temperature. Thus, at the start of the engine, the catalyst must be heated up immediately. For doing so, the nozzle device of the turbine, which is normally fully closed at low rotational speeds, is opened even at low rotational speeds at the start of the engine such that the exhaust gas flow substantially bypasses the turbine wheel of the turbine. The full open position of the nozzle device prevents heat loses at the turbine for heating up the catalyst very quickly.

BRIEF DESCRIPTION OF THE DRAWINGS

Preferred embodiments of the invention are explained by way of examples with reference to the accompanying drawings.

FIG. 5 shows a vaned shroud of the nozzle device according to the first embodiment of the present invention.

FIG. 7 shows schematically a parallel configuration of turbochargers, wherein one of the turbochargers comprises a nozzle device according to the first embodiment of the present invention.

FIG. 8 shows an application of the turbocharger having a nozzle device according to the present invention in a diesel engine boosting system.

FIG. 9 shows an application of the turbocharger having a nozzle device according to the present invention in an engine boosting system.

FIG. 10 shows another application of the turbocharger having a nozzle device according to the present invention in an engine boosting system.

DETAILED DESCRIPTION OF THE DRAWINGS

Figure 1:
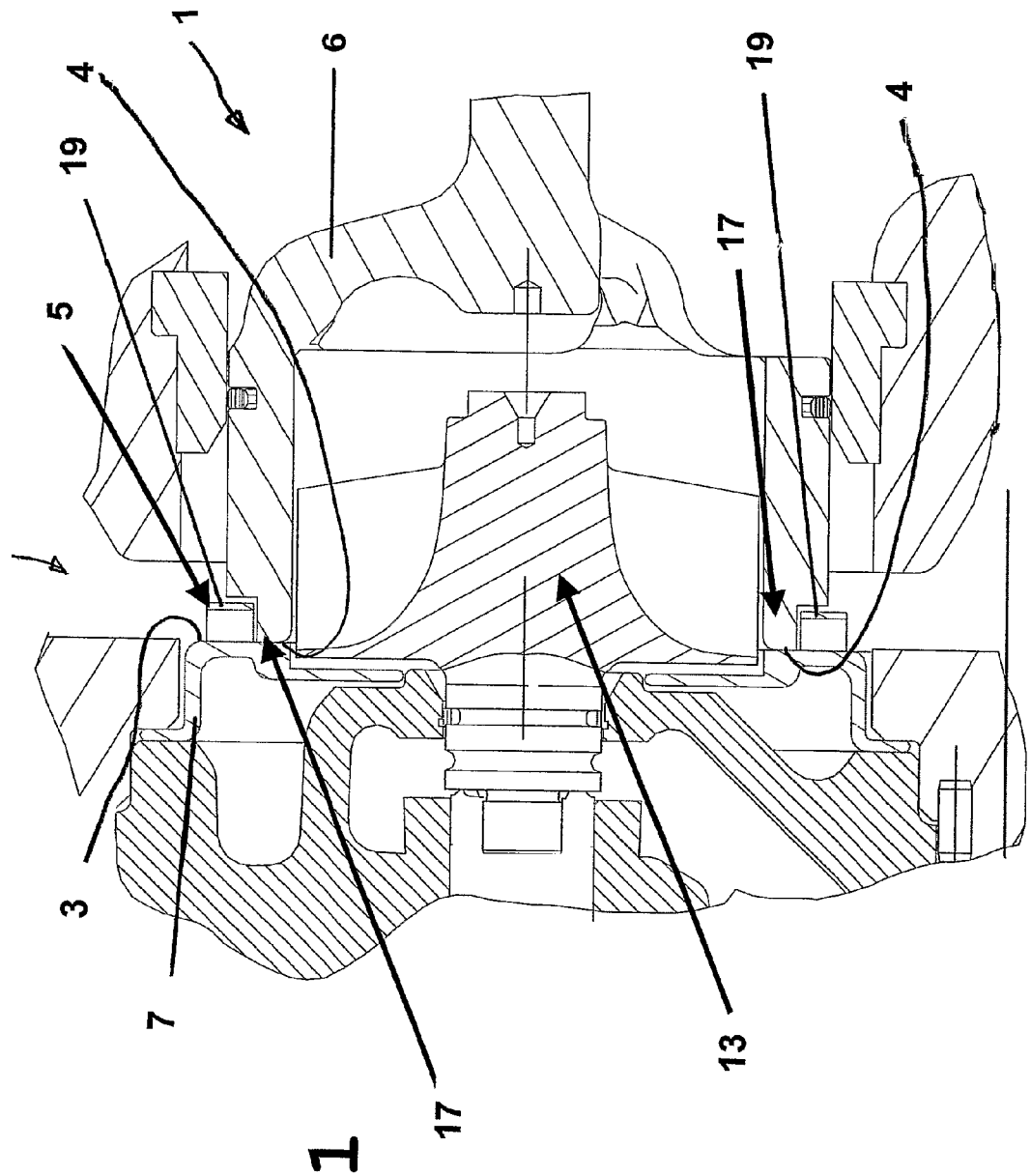
FIG. 1 shows a lateral section of a turbine having a nozzle device according to a first embodiment of the present invention.

A first embodiment of the present invention is explained with reference to the FIGS. 1 to 4.

Turbocharger

The nozzle device according to the invention is part of a turbocharger 8. The turbocharger 8 basically comprises an exhaust gas driven turbine 1 and an inlet air compressor (not shown). The inlet air compressor is driven by power generated by the exhaust gas driven turbine 1, wherein a turbine wheel 13 of the exhaust gas driven turbine 1 is mounted on a common shaft with a compressor impeller (not shown) of the inlet air compressor.

Turbine

The turbine 1 is provided with a housing (not shown) having an exhaust gas inlet (not shown) and an annular nozzle 2 for guiding the exhaust gas from the exhaust gas inlet to a turbine wheel 13 of the exhaust gas turbine 1.

Annular Nozzle

In FIGS. 1 to 4, the variable annular nozzle 2 is defined between an inboard wall 3 and an outboard wall 4, wherein the outboard wall 4 is axially movable for opening and completely closing the variable annular nozzle 2. An opening degree of the annular nozzle 2 is defined by the variable distance between the inboard and the outboard wall 4. The exhaust gas flow guided through the annular nozzle 2 rotates the turbine wheel 13 in accordance with the opening degree of the annular nozzle 2.

Inboard Wall

Figure 3:
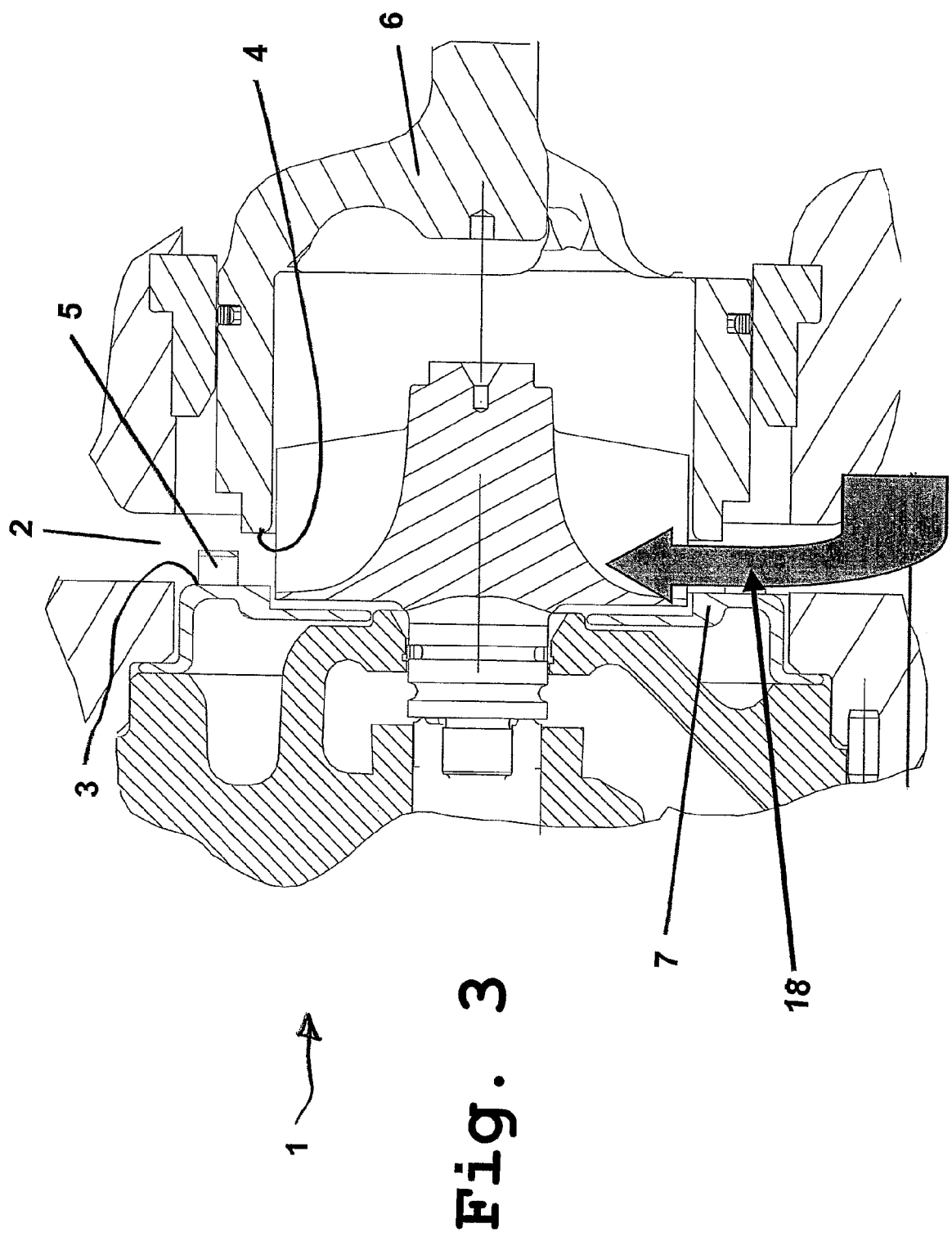
FIG. 3 shows a lateral section of a turbine having a nozzle device according to the first embodiment of the present invention.
Figure 4:
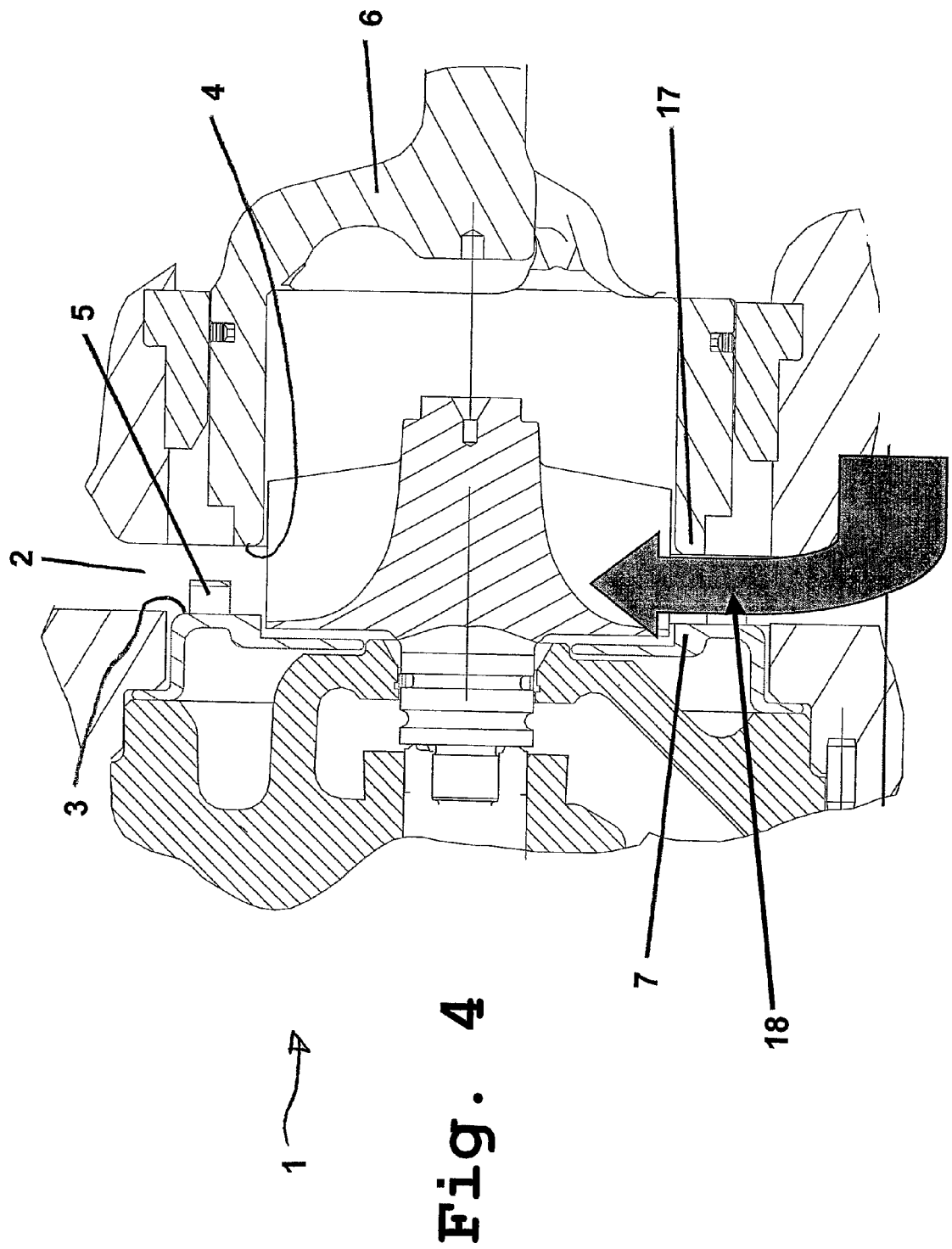
FIG. 4 shows a lateral section of a turbine having a nozzle device according to the first embodiment of the present invention.

The inboard wall 3 of the nozzle device according to the first embodiment is constituted by a vaned shroud 7 having an annular arrangement of fixed vanes 5 thereon. Thus, the fixed vanes 5 are interposed in the variable annular nozzle 2 to force the flow of the exhaust gas into a predetermined direction, as it is shown in FIGS. 2 to 4.

FIG. 5 shows the vaned shroud 7 having the fixed vanes 5 in more detail. The shroud 7 comprises a fixed vane support plate 3 serving as the inboard wall 3. The fixed vane support plate 3 is substantially circular in shape and is provided with an opening in a center portion thereof. The fixed vanes 5 are arranged on one surface of the fixed vane support plate 3 so as to protrude therefrom. The vanes 5 are substantially fan-shaped and slightly oblique with respect to the tangent of the fixed vane support plate 3.

Figure 2:
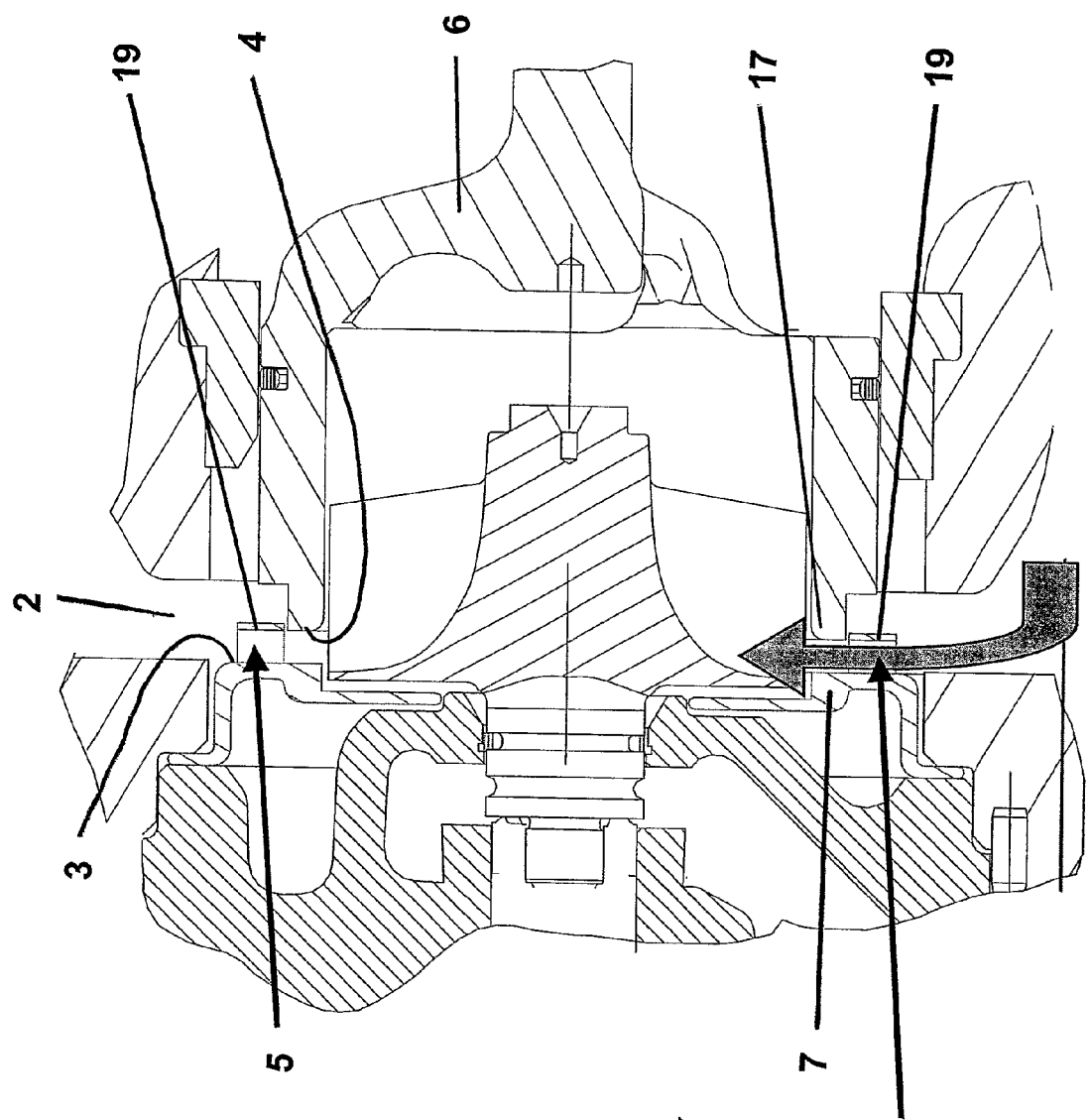
FIG. 2 shows a lateral section of a turbine having a nozzle device according to the first embodiment of the present invention.

The design of the vanes 5 is optimised to get maximum efficiency of the turbine 1 at a transition phase which is shown in FIG. 2. On the opposite side of the fixed vane support plate 3, the tips of the fixed vanes 5 are connected with a fixed vane tip ring 19. The fixed vane tip ring 19 increases the rigidity of the fixed vanes 5, and furthermore, the fixed vane tip ring 19 contributes to direct the exhaust gas flow 18 to the turbine wheel 13, as it can be gathered from FIGS. 2 to 4.

Outboard wall With reference back to FIGS. 1 to 4, the outboard wall 4 of the nozzle device according to the first embodiment is constituted by a tube-shaped piston 6 which is axially slidable into the radial inside of the annular arrangement of vanes 5 so as to contact the inboard wall 3.

Alternatively, the tube-shaped piston may be axially slidable onto the radial outside of the annular arrangement of vanes 5. According to FIGS. 6A and 6B, the tube-shaped piston 6 is provided so as to substantially surround the exhaust gas turbine wheel 13. The tube-shaped piston 6 forms downstream thereof an exhaust gas outlet 20 of the turbocharger apparatus. The tube-shaped piston 6 is preferably driven by a pneumatic actuator (not shown) connected to a driving rod 21 of the tube-shaped piston 6.

In FIGS. 1 to 4, the tube-shaped piston 6 according to the first embodiment comprises a stepped portion 17 at its distal end, which is axially slidable into the radial inside of the fixed vanes 5. The stepped portion 17 comprises a small outer diameter portion at the distal end of the tube-shaped piston 6 and a large outer diameter portion adjacent thereto. The stepped portion 17 according to the first embodiment enables to accurately fit the end of the tube-shaped piston 6 between the turbine wheel 13 and the fixed vanes 5, as it is shown in FIG. 1.

Figure 6B:
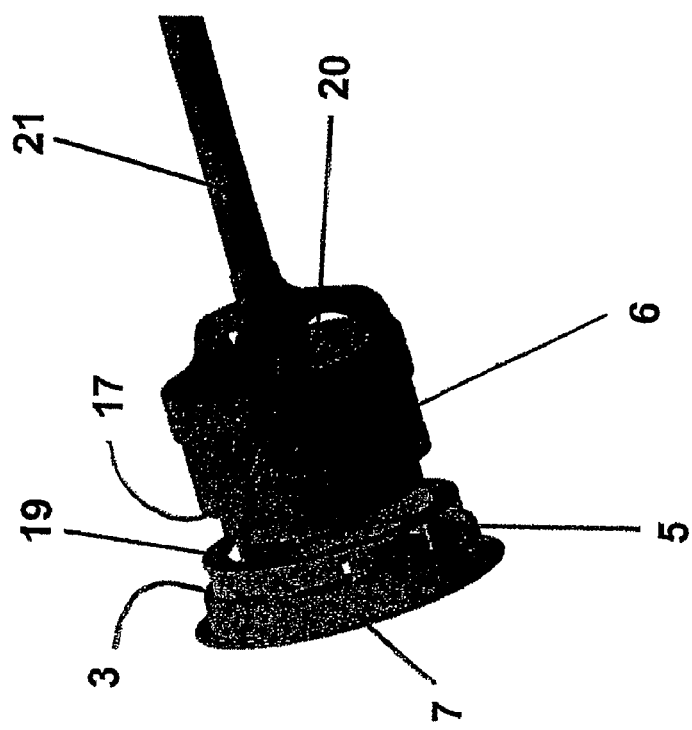
FIGS. 6A and 6B show an assembly of the vaned shroud and a tube-shaped piston of the nozzle device according to the first embodiment of the present invention.
Figure 6A:
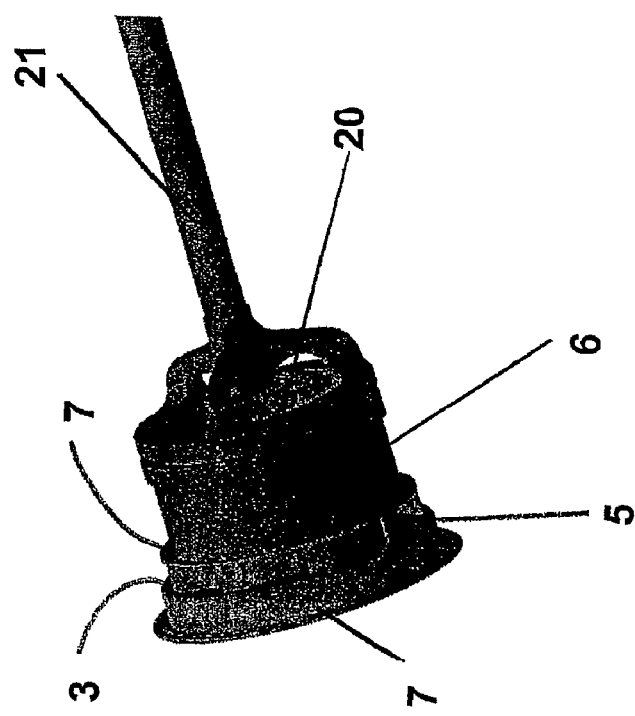

In FIGS. 6A and 6B, the vaned shroud 7 is assembled with the tube-shaped piston 6. FIG. 6A shows the half-opened nozzle 2 in accordance to FIG. 2, while FIG. 6B shows the fully opened nozzle 2 in accordance to FIG. 4. From FIG. 6B it is obvious that the annular arrangement of vanes 5 extends only over a part of the maximum interval between the inboard and outboard walls 3, 4, i.e. the maximum interval between the shroud 7 and the tube-shaped piston 6 when the nozzle 2 is fully opened. This is because the vanes 5 are optimised to get maximum efficiency of the turbine 1 in particular at the transition phase which is shown in FIG. 2. When the annular nozzle 2 is fully opened, primarily a maximum exhaust gas flow is required which must not be restricted by any vanes.

FIG. 7 shows a parallel configuration of turbochargers, comprising a first turbocharger 9 having a first turbine 23 and a first compressor 24, and a second turbocharger 8 having a second turbine 1 and a second compressor 25, wherein the first and second turbines 23,1 as well as the first and second compressors 24, 25 of both turbochargers 9, 8 are connected generally parallel in relation to an internal combustion engine, respectively (not shown).

According to the configuration, fresh air is fed in parallel to each of the compressors 24, by means of a first fresh air conduit 26 and second fresh air conduit 27, and the air discharged from the compressors 24, 25 is guided through an intercooler (not shown) to the intake side of the internal combustion engine (not shown). In the parallel configuration of turbochargers, the second compressor 25 is provided with an air re-circulation valve 28 using air flow regulating means for adjusting the amount of the re-circulated air. The re-circulation system in this embodiment includes a bypass conduit 29 with a butterfly valve 28 for adjusting the air mass-flow re-circulated back into the second fresh air conduit 27. At the exit of the second compressor 25, an additional butterfly valve 30 is provided for adjusting the flow of fresh air being discharged from the second compressor 25 into the engine.

At the turbine side of the configuration, the exhaust from the engine is fed through a first exhaust conduit 31 and a second exhaust conduit 32 to the first and second turbines 23,1, respectively. The first turbine 23 of the first turbocharger 9 is bypassed by a bypass passage 33 with a corresponding waste gate valve 34. The second turbine 1 of the second turbocharger 8 is equipped with a nozzle device according to the present invention, as it is shown in FIGS. 1 to 4. Alternatively, the second turbine 1 may be provided with movable vanes which are capable to completely closing the annular nozzle. The movable vanes of this modification replace the fixed vanes according to the first embodiment, and similar effects as in the first embodiment are achieved by the nozzle device with movable vanes.

In the following, the operation of the parallel configuration of turbochargers will be described.

The parallel configuration of turbochargers according to FIG. 7 allows a highly efficient function of the internal combustion engine at low, medium and high rotational speeds of the internal combustion engine.

At a low rotational speed of the internal combustion engine, for instance at about 1000-2000 rpm, the tube-shaped piston 6 fully closes the annular nozzle 2 of the second turbocharger 8 as shown in FIG. 1. Advantageously, when the tube-shaped piston 6 closes the annular nozzle 2 of the second turbine 1 of the second turbocharger 8, the exhaust gas flow to the turbine 1 of the second turbocharger 8 is removed to avoid oil leakage from the bearing system thereof. The exhaust gas flow to the first turbine 23 of the first turbocharger 9 is reduced to ensure an idling rotation of the first turbocharger 9.

Under this condition, the speed of the first turbocharger 9 is controlled by means of the waste gate valve 34. At this stage, only the first turbocharger 9 works normally to supercharge the engine.

At the low rotational speed, the butterfly valve 28 is open so that a re-circulation at the second compressor 25 is achieved. Due to the particular design of the configuration, during the re-circulation, the pressure in the second compressor 25 can be lowered so that the trust load becomes less important and the reliability is improved. The additional butterfly valve 30 remains closed and the first compressor 25 works normally to supercharge the engine.

In the range of a medium rotational speed of the internal combustion engine, for instance at about 2000-2500 rpm, the tube-shaped piston 6 opens progressively so as to regulate the pressure before the second turbine 1, as shown in FIGS. 2 and 3, and the exhaust gas flow 18 drives the second turbine 1 of the second turbocharger 8. In the same time, the butterfly valve 28 is progressively closed in order to balance the power between the second compressor 25 and the second turbine 1, so that by operation of the butterfly valve 28, the speed of the second turbocharger 8 can be regulated.

In the range of a high rotational speed of the internal combustion engine, for instance at about 2500-4000 rpm, the tube-shaped piston 6 is completely or almost completely open, as shown in FIG. 4. The speed of the first turbine 23 is regulated by means of the waste gate valve 34. During this operation, the additional butterfly valve 30 is open and the butterfly valve 28 is totally closed to balance the power between the second compressor 25 and the second turbine 1.

FIG. 8 shows an application of the turbocharger 8 having a nozzle device according to the present invention in a diesel engine boosting system.

The diesel engine boosting system basically comprises a single turbocharger 8 having a turbine 1 and a compressor 35 for a diesel engine 36. The turbine 1 includes a variable nozzle device according to the present invention. The air which is discharged from the compressor 35 is cooled by an intercooler 37 disposed between the compressor 35 and the engine 36. Thereby, the flow rate of the compressed air into the engine 36 is increased. At the intake side of the compressor 35, an air cleaner 38 for cleaning the intake air is disposed.

A diesel engine 36 generally requires for an engine braking operation, on the one side, a high back pressure upstream of the turbine 1 to achieve a high engine brake effect. The back pressure upstream of the turbine 1 increases as the opening of the nozzle device decreases.

On the other side, the pressure within a combustion cylinder of the engine 36 must be on a high level for maintaining the high back pressure upstream of the turbine 1. That is, for achieving a high pressure in the cylinder, the boost pressure downstream the compressor 35 must be high which in turn requires an operation of the compressor 35 to some extent. The compressor 35 increases the boost pressure as the opening of the nozzle device in the turbine 1 increases.

Consequently, the opening of the nozzle device must be optimised so as to achieve a large back pressure upstream the turbine 1 as well as a large boost pressure downstream the compressor 35. The optimisation of the nozzle opening is preferable performed by an electronic control device (not shown), for instance by means of a feedback-control of the back pressure upstream the turbine 1. The back pressure may be detected by means of a pressure detecting device (not shown) which is disposed upstream the turbine 1. The electronic control device variably feedback-controls the nozzle opening and must be free of any mechanical restrictions thereof. Thus, the variable nozzle device according to the present invention is advantageously suitable for this diesel engine boosting system because it is completely closeable so that there are no mechanical restrictions during the optimisation process.

FIG. 9 shows an application of the turbocharger 8 having a nozzle device according to the present invention in an engine boosting system.

The engine boosting system basically comprises a single turbocharger 8 having a turbine 1 and a compressor 35 for an engine 39, preferably for a gasoline engine 39.

The air which is discharged from the compressor 35 is cooled by an intercooler 37 disposed between the compressor 35 and the engine 39. Thereby, the flow rate of the compressed air into the engine 39 is increased. At the intake side of the compressor 35, an air cleaner 38 for cleaning the intake air is disposed.

The turbine 1 includes a variable nozzle device according to the present invention. At the outlet side of the turbine 1, a catalyst 40 for purifying the exhaust gas is disposed.

The catalyst 40 exhibits its optimum purifying function only when the catalyst has reached a specific exhaust gas purifying temperature. Thus, at the start of the engine 39, the catalyst 40 must be heated up immediately. For doing so, the nozzle device of the turbine 1 is opened even at low rotational speeds at the start of the engine 39 such that the exhaust gas flow substantially bypasses the turbine wheel 13 of the turbine 1. The full open position of the nozzle device prevents heat losses at the turbine 1 for heating up the catalyst 40 very quickly.

Preferably, this method for heating up the catalyst 40 at the start of the engine 39 is suitable in a system comprising a turbocharger 8 having the nozzle device according to the present invention, where the nozzle device, which is completely closeable, must be forced to be open at the start of the engine 39.

FIG. 10 shows a nozzle device 12 of a turbine in a turbocharger according to a second embodiment of the present invention in an engine boosting system. The upper half shows the closed position, whereas the lower half shows the opened position.

The nozzle device according to the second embodiment comprises a variable annular nozzle 2 defined between an inboard wall 3 and a tube-shaped piston 106, wherein an annular arrangement of vanes 5 protrudes from the inboard wall 3.

The nozzle device according to the second embodiment structurally differs from the first embodiment in that the tube-shaped piston 106 comprises a stepped portion 117 which is axially slidable onto the radial outside of the annular arrangement of vanes 5 so as to contact the inboard wall 3.

The stepped portion 117 comprises a large inner diameter portion at the distal end of the tube-shaped piston 106 and a small inner diameter portion adjacent thereto. Thus, the stepped portion 117 has a geometrical shape for directing the exhaust gas entering into the turbine 1 more appropriately to the downstream side of the turbine wheel 13.

The thus shaped nozzle device is advantageously suitable in an engine boosting system according to FIG. 9 for quickly heating up the catalyst 40.

Although the invention is explained in detail with reference to the particular embodiment, the invention is not limited to the structures of the embodiment. In particular, instead of fixed vanes 5, movable vanes can be implemented. It is to be noted that the movable vanes may be operated separately or in combination with the tube-shaped piston 6, 106.

The invention claimed is:

1. A method for operating an internal combustion engine, the method comprising the steps of:
    providing a first turbocharger and a second turbocharger arranged in parallel with respect to the engine, wherein the second turbocharger comprises a turbine comprising a turbine wheel disposed within a turbine housing, the turbine housing receiving exhaust gas from an engine, the turbine having an annular nozzle defined between an inboard wall and an outboard wall for guiding the exhaust gas to the turbine wheel, wherein the annular nozzle comprises a variable nozzle device comprising:
    a plurality of vanes mounted on the inboard wall and extending into the annular nozzle, the inboard wall and the vanes being fixed; and
    an axially movable, tube-shaped piston disposed within the turbine housing and having a piston end that forms the outboard wall of the annular nozzle such that the outboard wall is axially movable for varying an axial width of the annular nozzle, the piston end being stepped such that an annular first portion of the piston end extends axially farther toward the inboard wall than does a second portion of the piston end, the piston being axially movable in one direction into a fully closed position in which the first portion of the piston end passes along the radial outside or inside of the vanes and contacts the inboard wall so as to completely close the annular nozzle, and being axially movable in an opposite direction into partially open and fully open positions in which the first portion of the piston end is spaced from the inboard wall;
    completely closing the variable nozzle device of the second turbocharger when the engine is operating below a certain rotational speed, such that only the first turbocharger works to supercharge the engine; and
    opening the variable nozzle device of the second turbocharger when the engine is operating above said certain rotational speed.

2. A turbocharger having a variable nozzle device, comprising:
    a compressor and an exhaust gas-driven turbine, the turbine comprising a turbine wheel disposed within a turbine housing, the turbine housing receiving exhaust gas from an engine, the turbine having an annular nozzle defined between an inboard wall and an outboard wall for guiding the exhaust gas to the turbine wheel, wherein the annular nozzle comprises a variable nozzle device comprising:
    a plurality of vanes mounted on the inboard wall and extending into the annular nozzle, the inboard wall and the vanes being fixed; and
    an axially movable, tube-shaped piston disposed within the turbine housing and having a piston end that forms the outboard wall of the annular nozzle such that the outboard wall is axially movable for varying an axial width of the annular nozzle, the piston end being stepped such that an annular first portion of the piston end extends axially farther toward the inboard wall than does a second portion of the piston end, the piston being axially movable in one direction into a fully closed position in which the first portion of the piston end passes along the radial outside or inside of the vanes and contacts the inboard wall so as to completely close the annular nozzle, and being axially movable in an opposite direction into partially open and fully open positions in which the first portion of the piston end is spaced from the inboard wall.

3. The turbocharger of claim 2, wherein the annular nozzle has a maximum axial width when the piston is in the fully open position, and the vanes extend over only a part of the maximum axial width.

4. The turbocharger of claim 2, wherein the inboard wall is formed by a vaned shroud having the vanes.

5. The turbocharger of claim 2, wherein the turbine housing and the piston are configured such that the fully open position of the piston allows some of the exhaust gas flowing through the annular nozzle to bypass the turbine wheel.

6. The turbocharger of claim 2, wherein the first portion of the piston end passes along the radial outside of the vanes.

7. The turbocharger of claim 2, wherein the first portion of the piston end passes along the radial inside of the vanes.

8. An engine boosting system, comprising a first turbocharger and a second turbocharger arranged in parallel with respect to an internal combustion engine, wherein the second turbocharger comprises a turbine comprising a turbine wheel disposed within a turbine housing, the turbine housing receiving exhaust gas from an engine, the turbine having an annular nozzle defined between an inboard wall and an outboard wall for guiding the exhaust gas to the turbine wheel, wherein the annular nozzle comprises a variable nozzle device comprising:
    a plurality of vanes mounted on the inboard wall and extending into the annular nozzle, the inboard wall and the vanes being fixed; and an axially movable, tube-shaped piston disposed within the turbine housing and having a piston end that forms the outboard wall of the annular nozzle such that the outboard wall is axially movable for varying an axial width of the annular nozzle, the piston end being stepped such that an annular first portion of the piston end extends axially farther toward the inboard wall than does a second portion of the piston end, the piston being axially movable in one direction into a fully closed position in which the first portion of the piston end passes along the radial outside or inside of the vanes and contacts the inboard wall so as to completely close the annular nozzle, and being axially movable in an opposite direction into partially open and fully open positions in which the first portion of the piston end is spaced from the inboard wall.

9. A diesel engine boosting system, comprising a turbocharger that comprises a turbine comprising a turbine wheel disposed within a turbine housing, the turbine housing receiving exhaust gas from an engine, the turbine having an annular nozzle defined between an inboard wall and an outboard wall for guiding the exhaust gas to the turbine wheel, wherein the annular nozzle comprises a variable nozzle device comprising:

a plurality of vanes mounted on the inboard wall and extending into the annular nozzle, the inboard wall and the vanes being fixed; and an axially movable, tube-shaped piston disposed within the turbine housing and having a piston end that forms the outboard wall of the annular nozzle such that the outboard wall is axially movable for varying an axial width of the annular nozzle, the piston end being stepped such that an annular first portion of the piston end extends axially farther toward the inboard wall than does a second portion of the piston end, the piston being axially movable in one direction into a fully closed position in which the first portion of the piston end passes along the radial outside or inside of the vanes and contacts the inboard wall so as to completely close the annular nozzle, and being axially movable in an opposite direction into partially open and fully open positions in which the first portion of the piston end is spaced from the inboard wall; and an electronic control device operable to close the variable nozzle device of the turbocharger to an optimum position for engine braking by causing a high back pressure upstream of the turbine of the turbocharger.

10. An engine boosting system for an internal combustion engine, comprising:

a turbocharger comprising a turbine comprising a turbine wheel disposed within a turbine housing, the turbine housing receiving exhaust gas from an engine, the turbine having an annular nozzle defined between an inboard wall and an outboard wall for guiding the exhaust gas to the turbine wheel, wherein the annular nozzle comprises a variable nozzle device comprising:

a plurality of vanes mounted on the inboard wall and extending into the annular nozzle, the inboard wall and the vanes being fixed; and an axially movable, tube-shaped piston disposed within the turbine housing and having a piston end that forms the outboard wall of the annular nozzle such that the outboard wall is axially movable for varying an axial width of the annular nozzle, the piston end being stepped such that an annular first portion of the piston end extends axially farther toward the inboard wall than does a second portion of the piston end, the piston being axially movable in one direction into a fully closed position in which the first portion of the piston end passes along the radial outside or inside of the vanes and contacts the inboard wall so as to completely close the annular nozzle, and being axially movable in an opposite direction into partially open and fully open positions in which the first portion of the piston end is spaced from the inboard wall, wherein the turbine housing and the piston are configured such that the fully open position of the piston allows some of the exhaust gas flowing through the annular nozzle to bypass the turbine wheel; and a catalyst disposed downstream of the turbocharger, wherein the engine boosting system is operable to open the variable nozzle device at a start of the engine so as to cause exhaust gas to bypass the turbine wheel and heat up the catalyst.

* * * * *

UNITED STATES PATENT AND TRADEMARK OFFICE
CERTIFICATE OF CORRECTION

PATENT NO. : 7,581,394 B2
APPLICATION NO. : 10/582103
DATED : September 1, 2009
INVENTOR(S) : Perrin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 307 days.

Signed and Sealed this

Fourteenth Day of September, 2010

David J. Kappos
*Director of the United States Patent and Trademark Office*